(12) United States Patent
Marji et al.

(10) Patent No.: US 12,370,936 B2
(45) Date of Patent: Jul. 29, 2025

(54) LIFT GATE WITH INDUCTIVE COUPLING PLATFORM

(71) Applicant: MAXON INDUSTRIES, INC., Santa Fe Springs, CA (US)

(72) Inventors: George Y. Marji, La Mirada, CA (US); Karapet Ablabutyan, Glendale, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 420 days.

(21) Appl. No.: 17/771,258

(22) PCT Filed: Nov. 5, 2020

(86) PCT No.: PCT/US2020/059056
§ 371 (c)(1),
(2) Date: Apr. 22, 2022

(87) PCT Pub. No.: WO2021/092137
PCT Pub. Date: May 14, 2021

(65) Prior Publication Data
US 2022/0410786 A1    Dec. 29, 2022

Related U.S. Application Data

(60) Provisional application No. 62/930,671, filed on Nov. 5, 2019.

(51) Int. Cl.
*B65G 1/04* (2006.01)
*B60P 1/44* (2006.01)
(Continued)

(52) U.S. Cl.
CPC ........... *B60P 1/4471* (2013.01); *B60P 1/445* (2013.01); *B60Q 1/307* (2013.01); *B60R 16/03* (2013.01);
(Continued)

(58) Field of Classification Search
None
See application file for complete search history.

(56) References Cited

U.S. PATENT DOCUMENTS

| | | | | |
|---|---|---|---|---|
| 3,638,811 | A | * | 2/1972 | Robinson ................ B60P 1/445 |
| | | | | 250/214 R |
| 5,550,452 | A | * | 8/1996 | Shirai ..................... H02J 50/10 |
| | | | | 320/108 |

(Continued)

OTHER PUBLICATIONS

International Search Report and Written Opinion for PCT/US20/59056, mailed Feb. 2, 2021.

*Primary Examiner* — Mark C Hageman
(74) *Attorney, Agent, or Firm* — Command IP LLP; Michael Zarrabian

(57) ABSTRACT

Systems, devices, and methods for an inductive coupling platform system comprising: an inductive coupling lift gate platform comprising: a first segment; a second segment; at least one primary inductive coupling component disposed in at least a portion of the first segment; and at least one receiver inductive coupling component disposed in at least a portion of the second segment; where inductive contact is provided between the at least one primary inductive coupling component and the at least one receiver inductive coupling component in an unfolded position; and where power or data is transmitted via the inductive contact between the at least one primary inductive coupling component and the at least one receiver inductive coupling component in the unfolded position.

14 Claims, 14 Drawing Sheets

(51) Int. Cl.
  *B60Q 1/30* (2006.01)
  *B60R 16/03* (2006.01)
  *H01F 38/14* (2006.01)
  *H02J 50/00* (2016.01)
  *H02J 50/10* (2016.01)

(52) U.S. Cl.
  CPC ............ *H01F 38/14* (2013.01); *H02J 50/005* (2020.01); *H02J 50/10* (2016.02); *H01F 2038/143* (2013.01)

(56) References Cited

U.S. PATENT DOCUMENTS

| | | | | |
|---|---|---|---|---|
| 7,367,770 | B2 * | 5/2008 | Bar | B60P 1/4485 |
| | | | | 414/549 |
| 7,573,221 | B2 * | 8/2009 | Rock | B60P 1/4421 |
| | | | | 318/443 |
| 8,796,990 | B2 * | 8/2014 | Paparo | H02J 7/0044 |
| | | | | 320/108 |
| 10,144,345 | B2 * | 12/2018 | Stinson | F21S 9/02 |
| 10,414,359 | B2 * | 9/2019 | Wadell | B60L 1/14 |
| 11,437,850 | B2 * | 9/2022 | Quigley | H02J 50/12 |
| 2005/0191161 | A1 * | 9/2005 | Ablabutyan | B60P 1/445 |
| | | | | 414/557 |
| 2014/0169919 | A1 | 6/2014 | Ablabutyan et al. | |
| 2015/0147145 | A1 | 5/2015 | Nowak | |
| 2015/0251584 | A1 * | 9/2015 | Deyaf | H04B 5/79 |
| | | | | 307/10.8 |
| 2017/0305323 | A1 | 10/2017 | Marji et al. | |
| 2019/0056466 | A1 | 2/2019 | Chu et al. | |

\* cited by examiner

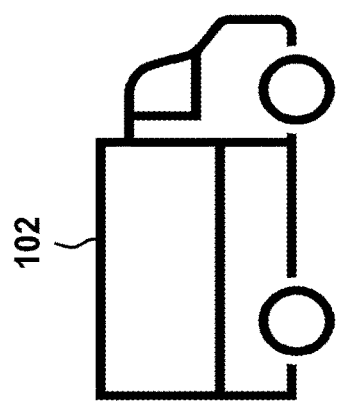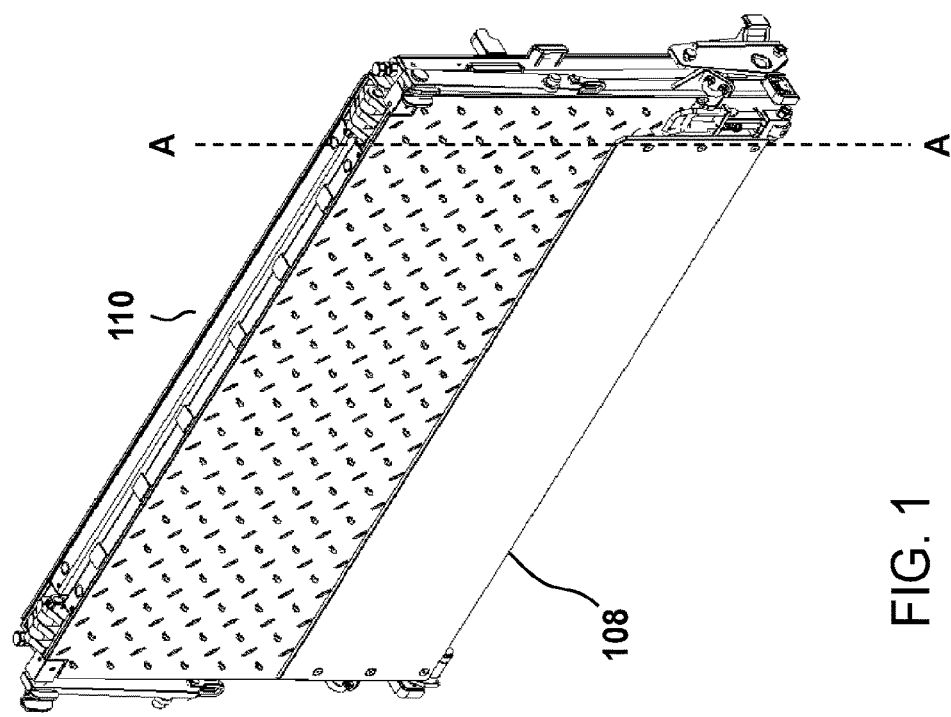
FIG. 1

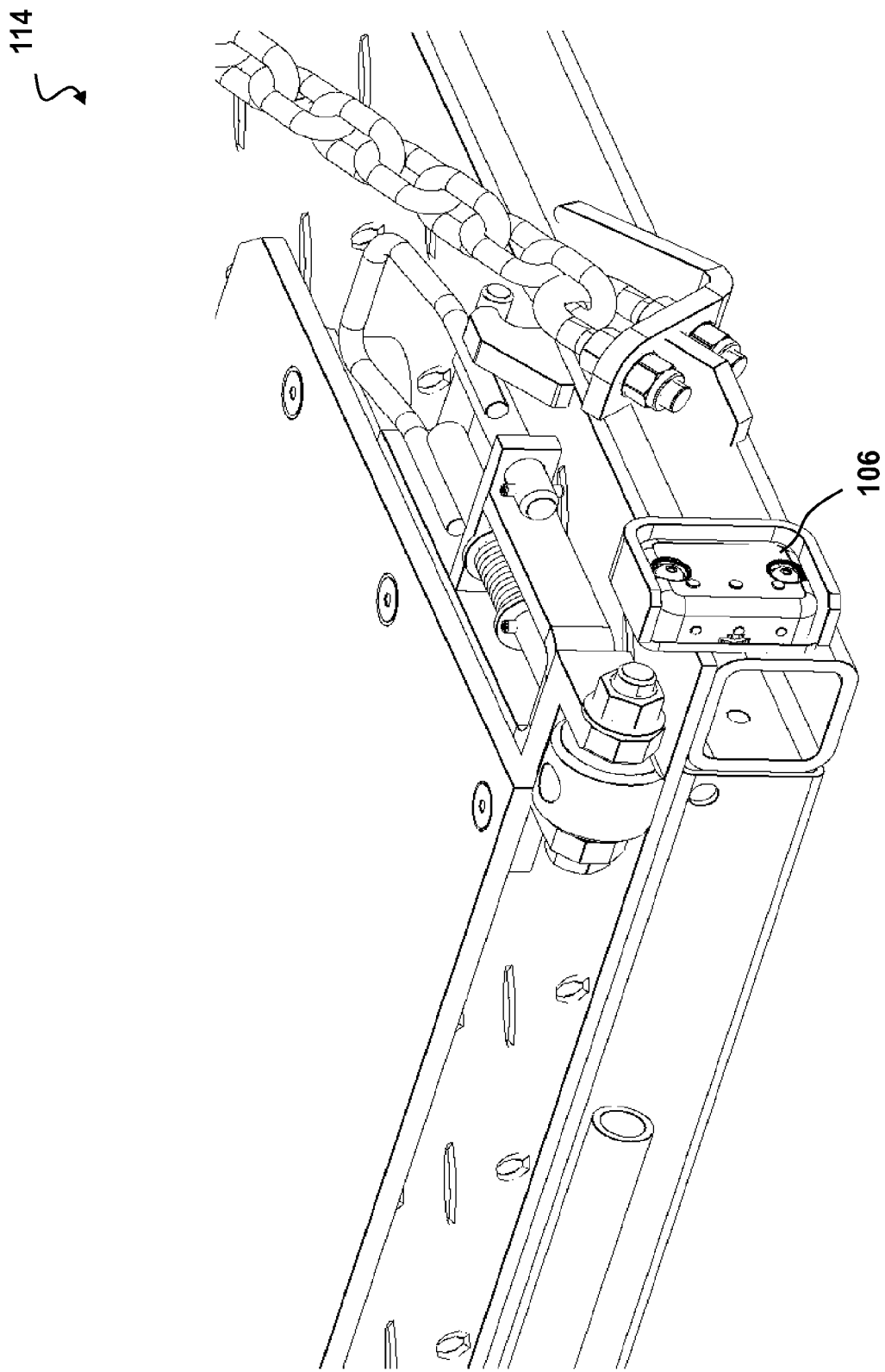

LIFT GATE WITH INDUCTIVE COUPLING PLATFORM

CROSS-REFERENCE TO RELATED APPLICATION

This application is a 35 U.S.C § 371 National Stage Entry of International Application No. PCT/US2020/059056, filed Nov. 5, 2020, which claims the priority benefit of U.S. Provisional Patent Application Ser. No. 62/930,671, filed Nov. 5, 2019, all of which are hereby incorporated herein by reference in their its entirety for all purposes.

FIELD OF ENDEAVOR

The invention relates generally to vehicle lift gates, and more particularly to power transmission for a lift gate platform.

BACKGROUND

Lifts such as lift gates and accompanying lift platforms are typically mounted at a structure such as an opening at a rear of a vehicle to lift payloads on the lift platform from one level (e.g., ground level) up to another level (e.g., the bed of the vehicle), or vice versa. The operation of a lifting mechanism may rotate the lift platform into an inverted, stowed position beneath the vehicle body. Actuators, such as hydraulic actuators and electric actuators, are used to provide lifting force for moving the lift platform.

SUMMARY

An inductive coupling platform system may include: an inductive coupling lift gate platform comprising: a first segment; a second segment, where the second segment may be configured to rotate relative to the first segment between a folded position and an unfolded position, where the first segment may be in-line with the second segment in the unfolded position; at least one primary inductive coupling component disposed in at least a portion of the first segment; and at least one receiver inductive coupling component disposed in at least a portion of the second segment; where inductive contact may be provided between the at least one primary inductive coupling component and the at least one receiver inductive coupling component in the unfolded position; and where at least one of: power and data may be transmitted via the inductive contact between the at least one primary inductive coupling component and the at least one receiver inductive coupling component in the unfolded position.

Additional system embodiments may further include: a lift gate, where the lift gate comprises the inductive coupling lift gate platform. Additional system embodiments may further include: a vehicle, where the lift gate may be connected at a rear of the vehicle. Additional system embodiments may further include: at least one battery of the vehicle; and a first wire, where the first wire may be connected between the at least one battery and the at least one primary inductive coupling component, and where power may be transmitted from the at least one battery to the at least one primary inductive coupling component via the first wire.

Additional system embodiments may further include: at least one lighting device; and a second wire, where the second wire may be connected between the at least one receiver inductive coupling component and the at least one lighting device, and where power may be transmitted from the at least one receiver inductive coupling component to the at least one primary inductive coupling component via the second wire. In additional system embodiments, at least a portion of the first wire may be disposed in one or more support members of the first segment of the inductive coupling lift gate platform. In additional system embodiments, at least a portion of the second wire may be disposed in one or more support members of the second segment of the inductive coupling lift gate platform.

In additional system embodiments, the at least one primary inductive coupling component may be embedded in a first cavity of the first segment. In additional system embodiments, the at least one receiver inductive coupling component may be embedded in a second cavity of the second segment.

Another inductive coupling platform system may include: an inductive coupling lift gate platform comprising: a first segment; a second segment, where the second segment may be configured to rotate relative to the first segment between a folded position and an unfolded position, where the first segment may be in-line with the second segment in the unfolded position; a first inductive coupler disposed proximate a first side of the inductive coupling lift gate platform; a second inductive coupler disposed proximate a second side of the inductive coupling lift gate platform, where the first side may be distal from the second side of the inductive coupling lift gate platform; where inductive contact may be provided for the first inductive coupler and the second conductive coupler in the unfolded position.

In additional system embodiments, inductive contact may be broken for the first inductive coupler and the second conductive coupler in the folded position. In additional system embodiments, the first inductive coupler further comprises: a primary inductive coupling component disposed in at least a portion of the first segment; and a receiver inductive coupling component disposed in at least a portion of the second segment.

Additional system embodiments may further include: a lift gate, where the lift gate comprises the inductive coupling lift gate platform; at least one battery; and a first wire, where the first wire may be connected between the at least one battery and the primary inductive coupling component, and where power may be transmitted from the at least one battery to the primary inductive coupling component via the first wire. Additional system embodiments may include: at least one lighting device; and a second wire, where the second wire may be connected between the receiver inductive coupling component and the at least one lighting device, and where power may be transmitted from the receiver inductive coupling component to the primary inductive coupling component via the second wire.

In additional system embodiments, at least a portion of the first wire may be disposed in one or more support members of the first segment of the inductive coupling lift gate platform. In additional system embodiments, at least a portion of the second wire may be disposed in one or more support members of the second segment of the inductive coupling lift gate platform.

Another inductive coupling platform system may include: a rail; and a trunnion tube, where the trunnion tube may be configured to slide along the rail; an inductive lift gate platform connected to the trunnion tube, where the trunnion tube may be configured to slide from a stowed position to an active position; a primary inductive coupling component disposed at a fixed position on the rail; a receiver inductive coupling component disposed on the trunnion tube, where the receiver inductive coupling component moves with the trunnion tube as the trunnion tube slides relative to the rail; where inductive contact may be provided between the primary inductive coupling component and the receiver inductive coupling component in the active position.

In additional system embodiments, the inductive lift gate platform may be below a vehicle in the stowed position, and where the inductive lift gate platform may be extended from the vehicle in the active position. In additional system embodiments, the lift gate platform comprises two or more segments. In additional system embodiments, a first segment of the two or more segments may be a main platform section, and where a second segment of the two or more segments may be a flip over section.

BRIEF DESCRIPTION OF THE DRAWINGS

The components in the figures are not necessarily to scale, emphasis instead being placed upon illustrating the principles of the invention. Like reference numerals designate corresponding parts throughout the different views. Embodiments are illustrated by way of example and not limitation in the figures of the accompanying drawings, in which:

FIG. 1 depicts a vehicle with an inductive coupling lift gate platform;

FIG. 7 depicts a perspective view of a lighting device embedded in a segment of the inductive coupling lift gate platform of FIG. 1;

DETAILED DESCRIPTION

Figure 2:
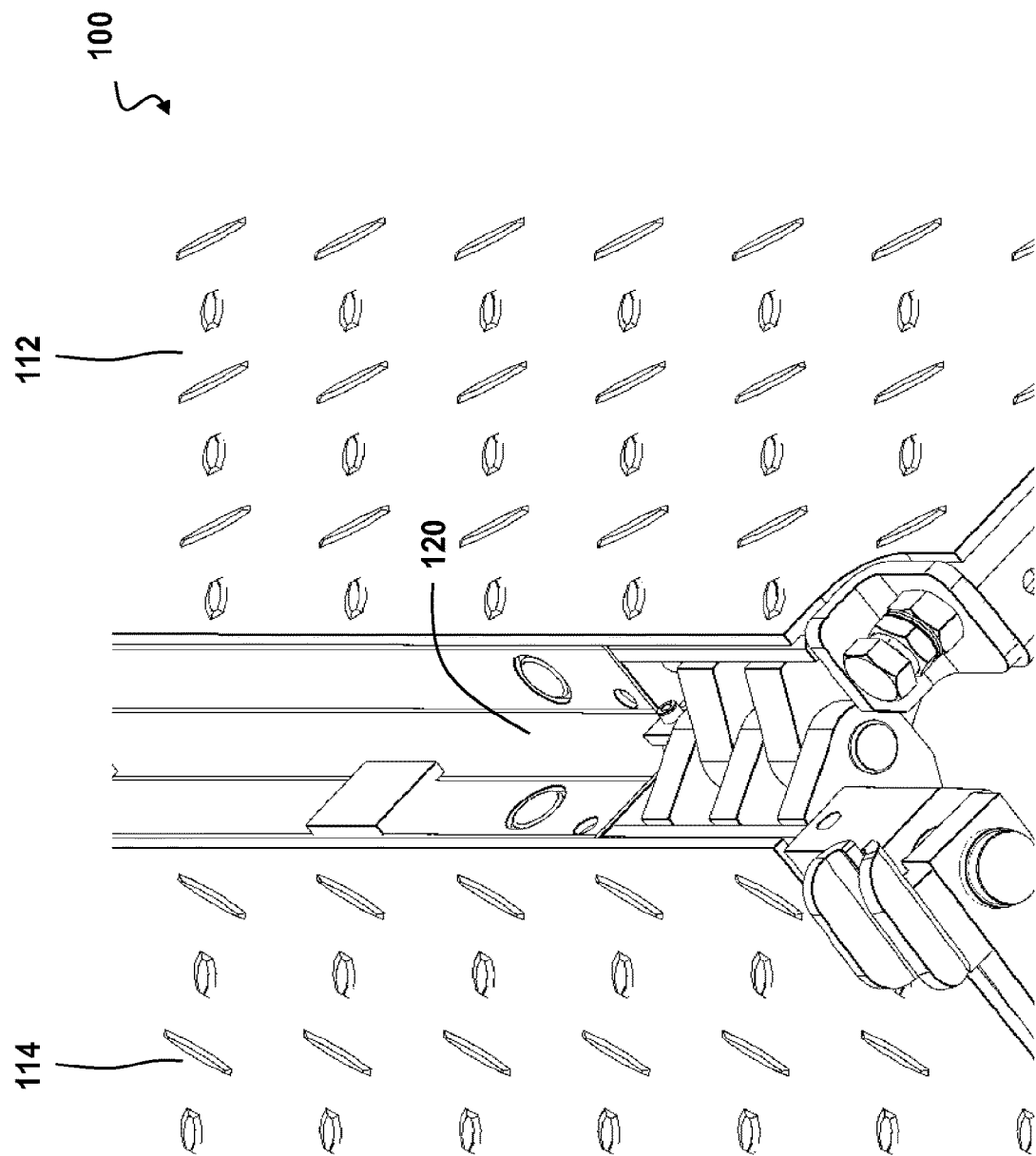
FIG. 2 depicts a close-up perspective top view of the inductive coupling lift gate platform of FIG. 1.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

An inductive coupling platform system includes a first segment of the lift gate having a primary inductive coupling component and a second segment with at least one receiver inductive coupling component. When the lift gate is in a stored position, the primary inductive coupling component and the at least one receiver inductive coupling component are not in contact. As the lift gate unfolds to a working position, the primary inductive coupling component contacts the at least one receiver inductive coupling component, which allows for direct power transmission from a battery, such as the vehicle's battery, connected to the first segment of the lift gate to an accessory, such as a light, connected to the second segment of the lift gate. In some embodiments, the inductive coupling effect may occur anywhere on the system. In some embodiments, the inductive coupling may occur on the sliding mechanism. In other embodiments, the inductive coupling may occur on the platform. In some embodiments, the sensors may be placed anywhere on the track and/or platform.

The disclosed connection between the primary inductive coupling component and the at least one receiver inductive coupling component may eliminate the need for sensors and/or batteries inside the accessory and/or may provide more consistent output of the accessory. For example, a light may turn on automatically when the lift gate is in the working condition and turn off when the lift gate is in a stored position. Whether power is transmitted from the battery to the primary inductive coupling component, to the at least one receiver inductive coupling component, and to the accessory depends on the state of the lift gate in either a worked or stored position. Alternatively, the disclosed connection between the primary inductive coupling component and the at least one receiver inductive coupling component may be used in conjunction with sensors and/or batteries inside the accessory for additional purposes. For example, sensors inside the accessory, such as a flashing light, may include a daylight detection sensor. The daylight detection sensor may increase power transmission to the lights through the inductive couplers to increase brightness. Alternatively, the daylight detection sensor may impede power transmission to the lights if there is no need for the lights to operate during the daytime. Other sensors may be included as well, such as an accelerometer or a gyroscope. Furthermore, batteries may be included to boost amperage/power transmission. In one embodiment, the transmission capacity for the inductive coupler is 12 Watts. Other transmission capacities are possible and contemplated.

With respect to FIG. 1, an inductive coupling platform system 100 for a vehicle 102 is illustrated. In one embodiment, the vehicle 102 is a truck. In another embodiment, the vehicle 102 may be a pickup truck, service body, cargo van, trailer, or the like.

Figure 9:
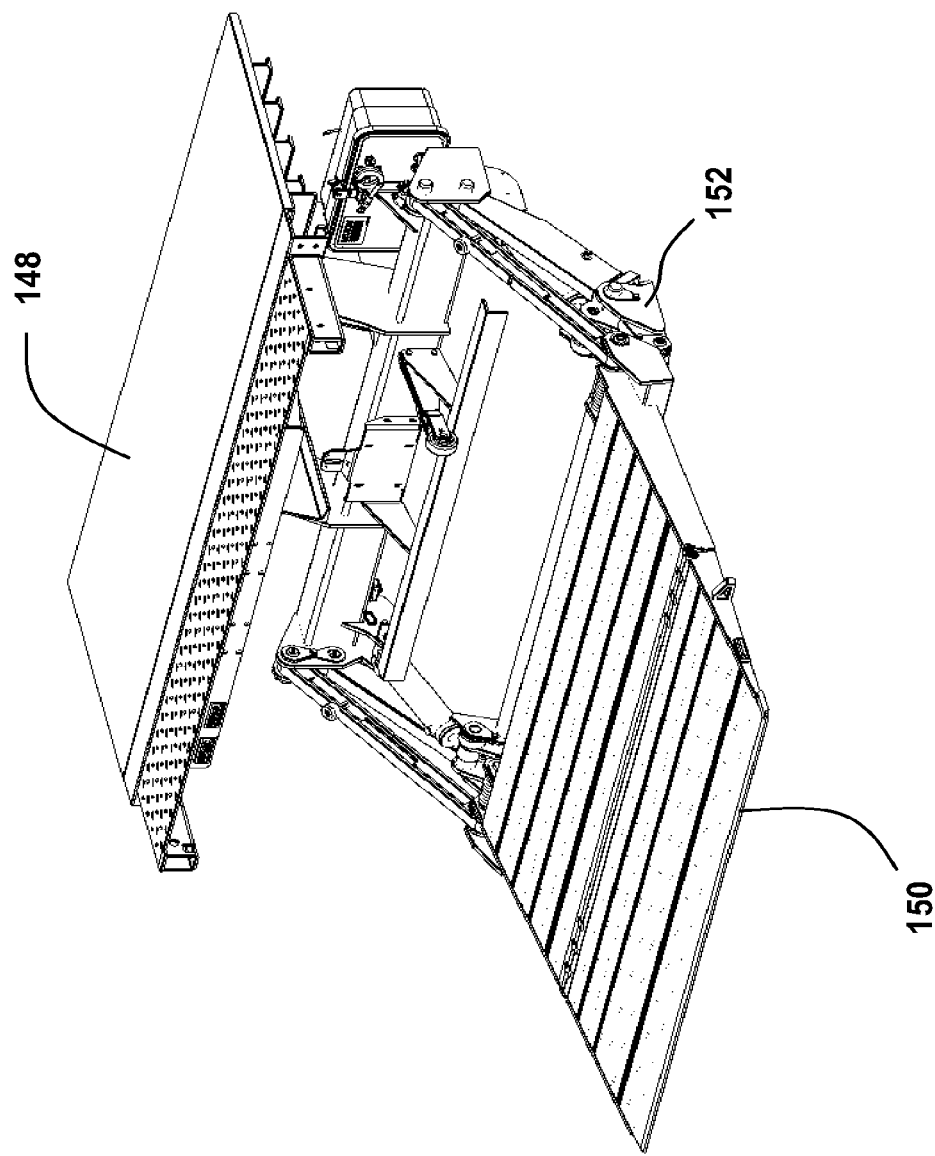
FIG. 9 depicts a perspective view of an alternative inductive coupling lift gate platform.
Figure 11:
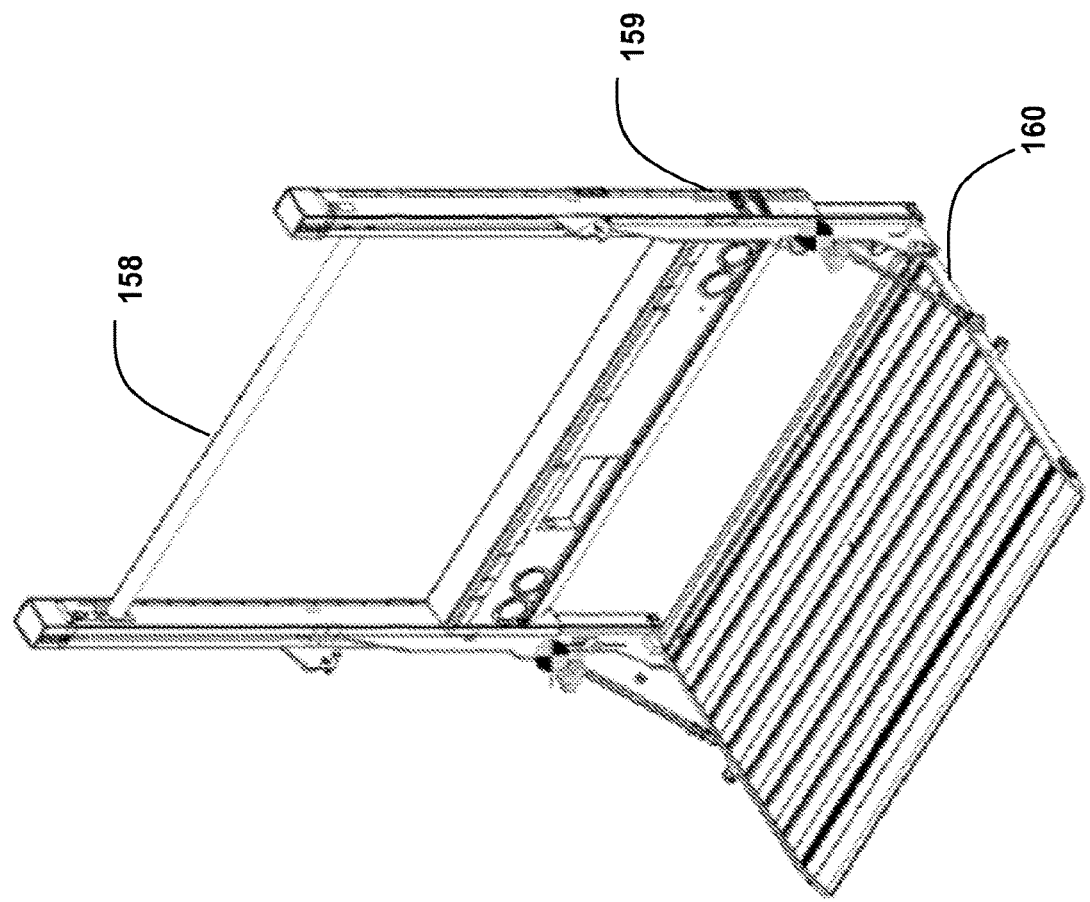
FIG. 11 depicts a perspective view of an alternative inductive coupling lift gate platform.
Figure 12:
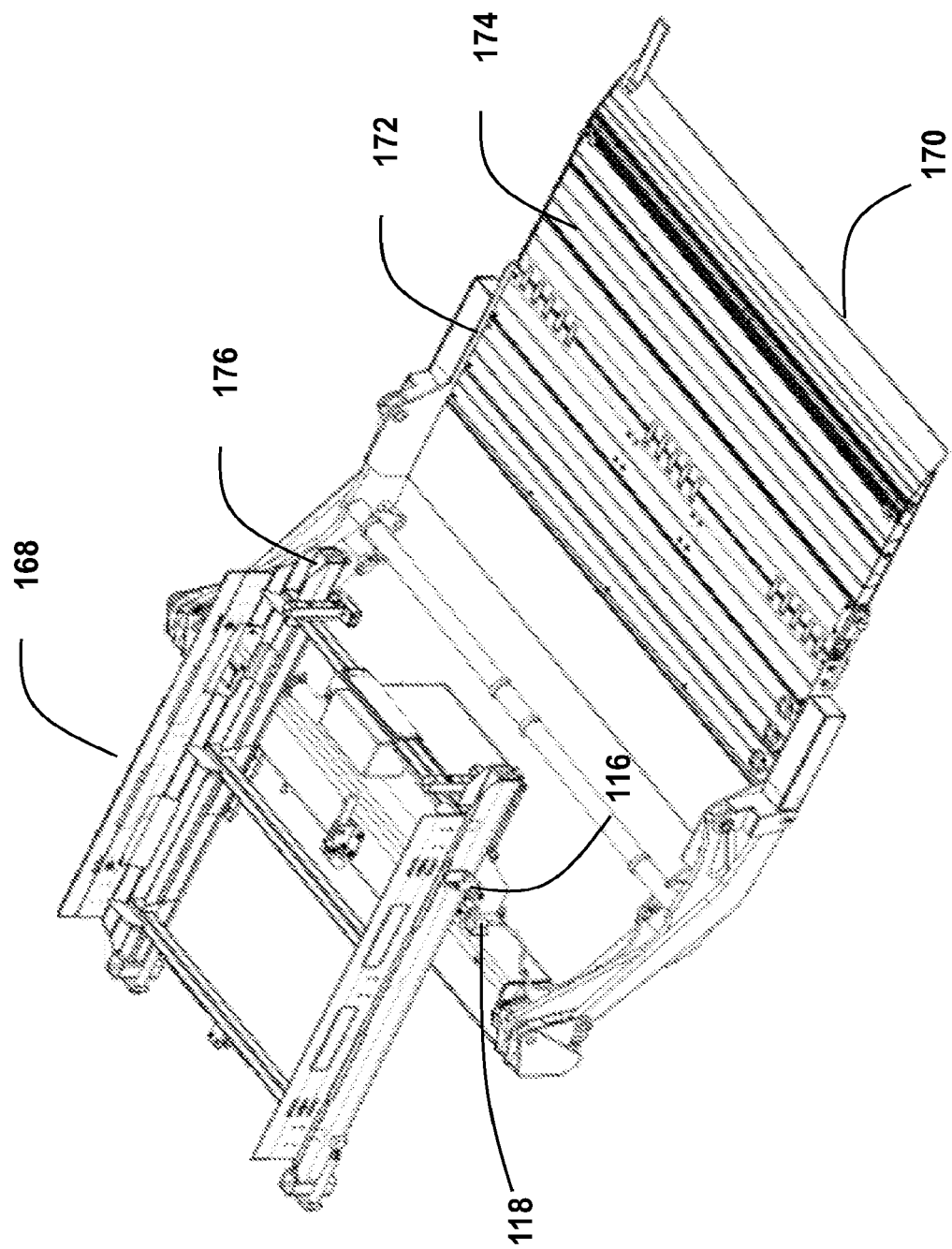
FIG. 12 depicts a perspective view of an alternative inductive coupling lift gate platform.

The vehicle 102 may have a lift gate 108. The lift gate 108 may provide for easy, safe, and cost-effective lifting of light to heavy loads. In one embodiment, the lift gate 108 may be mounted at a structure of the vehicle 102, such as an opening at the rear of a vehicle 102. In one embodiment, the lift gate 108 may serve as the rear door or tailgate of the vehicle 102. In another embodiment, the lift gate 108 may be stored on the underside of the vehicle 102. Other possible types of attachment of the lift gate 108 to the vehicle 102 are possible and contemplated. The lift gate 108 may be a part of a liftgate assembly, such as shown in FIGS. 9, 11, and 12.

The lift gate 108 has an accompanying inductive coupling lift gate platform 110. The lift gate platform 110 may include two or more segments, such as a lift gate platform 110 having two segments that may be folded against one another for storage and unfolded for operation. In one embodiment, the inductive coupling lift gate platform 110 is made of steel. In another embodiment, the inductive coupling lift gate platform 110 is made of aluminum, or a combination of steel and aluminum. The inductive coupling lift gate platform 110 may lift payloads on the lift gate 108 from one level (e.g., ground level) up to another level (e.g., the bed of the vehicle 102), or vice versa.

Inductive coupling (or "electromagnetic induction") as disclosed herein uses magnetic fields that are a natural part of current's movement through a wire or some other conductive material, such as brass, steel or aluminum. Other possible conducting materials include semiconductors, such as silicon carbide, carbon, or graphite. Generally speaking, other coupling connections, such as pin connectors have a limited mating cycle (lifespan), while inductive couplers may function indefinitely. Inductive coupling may be "non-contact" in that the conducting component passing electrical current to a second conducting component may not be not in physical contact with the second conducting component. Rather, an air gap may be present between the inductive coupling components and allow for bidirectional transmission of electrical power and/or data across the air gap in some embodiments. In other embodiments, no air gap may be present and there may be face to face contact between the inductive coupling components.

Figure 13:
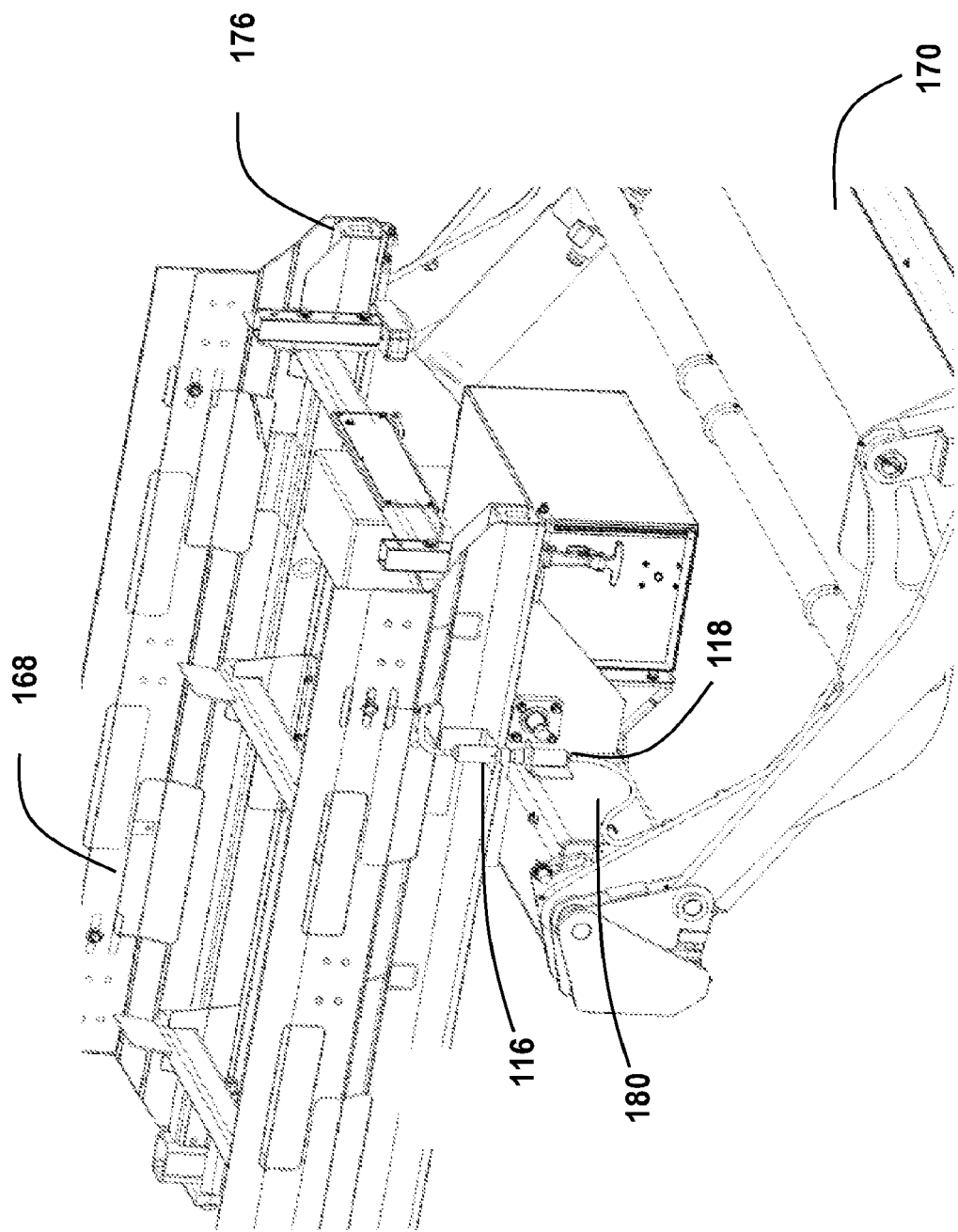
FIG. 13 depicts a zoomed-in perspective view of the inductive coupling lift gate platform of FIG. 12.

The receiver coupler may be connected to any sensor that is able to convert the sensed analog signal to a digital signal. That data may then be transmitted by the couplers to a controller connected to the primary inductive coupler. For example, a receiver coupler may be connected to a motor. The motor may have a transducer that measures direction, speed, and location. This data can direction, speed, and/or location may be transmitted through the couplers to a microcontroller. This data may be used by the microcontroller to adjust the speed of deployment of the liftgate mechanism as it rolls out, such as shown in FIGS. 12-13, to reduce it as the liftgate approaches fully extended or fully retracted position. This may prevent a strong impact of the liftgate against the mounting mechanism/lifting mechanism or other structural objects once the liftgate reaches the fully extended or retracted position. In one embodiment, two separate motors may be connected in the same fashion so they may be synchronized by a microcontroller. Another data source may be a pressure transducer that may be used to measure hydraulic pressure in the cylinders. Another data source may be one or more proximity sensors. Another data source may be an open/store position sensing. Another data source may be a data logger, which may be used to measure how many cycles the liftgate has. In other embodiments, various forms of digital signals may be transmitted by the couplers for the purpose of control or data logging.

With respect to FIG. 2, the inductive coupling platform system 100 provides for contactless bidirectional transmission of power and/or data across an air gap 120 between inductive coupling components of an inductive coupler 115. The air gap 120 may reduce wear between the components, increase durability, reduce downtime for maintenance or replacement, and the like. In embodiments without an air gap, the disclosed benefits remain as there is no actual wire or connectors mating the two inductive couplers. Using standard pin connectors may not be feasible or maintainable in the situations disclosed herein, which is why the disclosed inductive couplers are useful.

Figure 3:
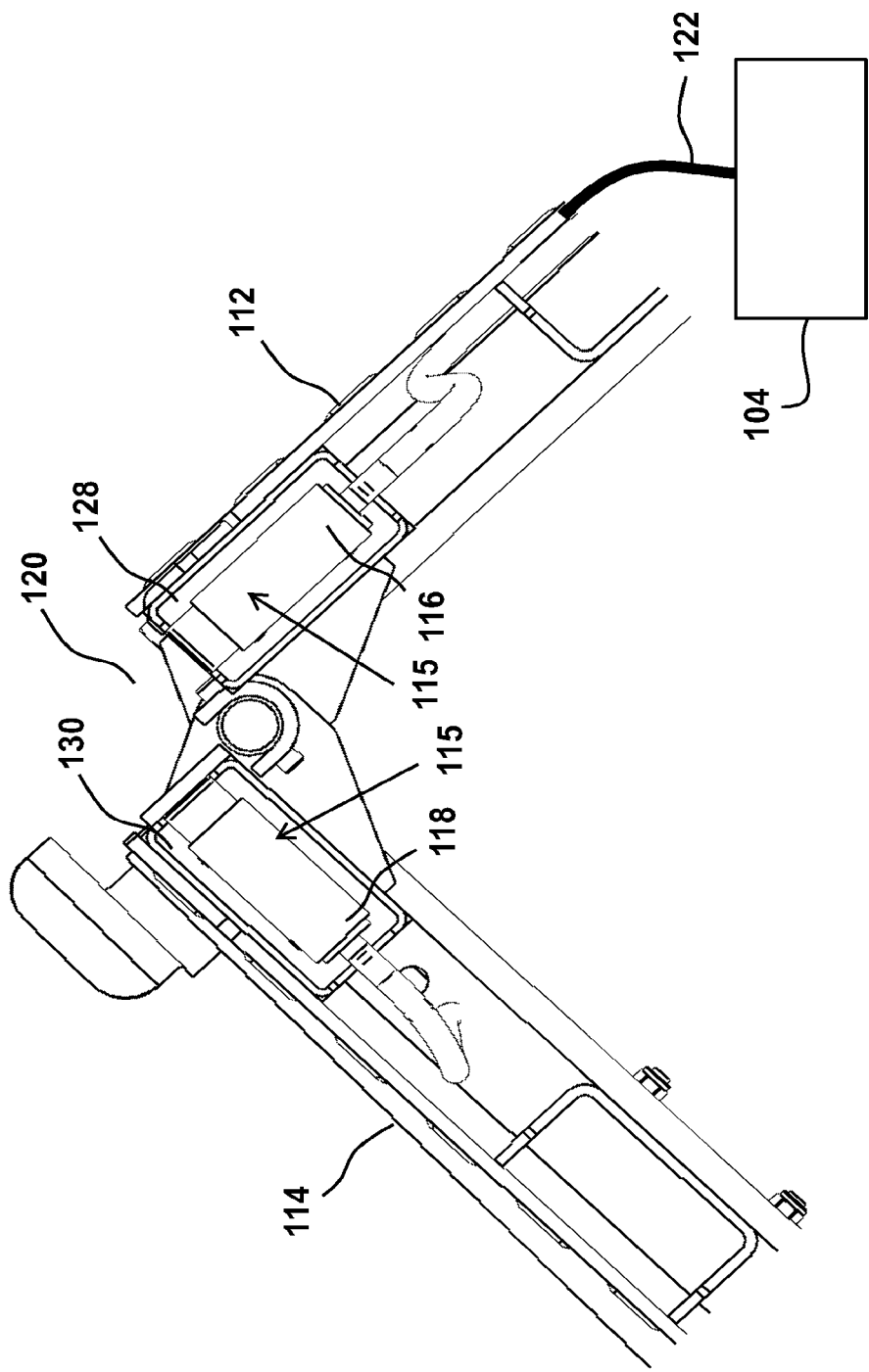
FIG. 3 depicts a cross-sectional side view of inductive coupling lift gate platform about line A-A of FIG. 1 with an embedded inductive coupler.

More specifically, and with respect to FIG. 3, each inductive coupler 115 may be embedded in each respective portion of the inductive coupling lift gate platform 110. Each inductive coupler 115 may function in a wide variety of environments, such as very low and very high humidity. Additionally, each inductive coupler 115 may still function properly even when in contact with liquid, such as water or grease.

A first segment 112 of two or more segments of the inductive coupling lift gate platform 110 may include a primary inductive coupling component 116. The primary inductive coupling component 116 may be embedded in a first cavity 128 of the first segment 112. In one embodiment, the primary inductive coupling component 116 is made of chrome-plated brass. In one embodiment, the primary inductive coupling component 116 is cylindrical in shape. In another embodiment, the primary inductive coupling component 116 is rectangular in shape. In one embodiment, the primary inductive coupling component 116 has a length of 77.1 mm and an active area diameter of 26.5 mm. Other dimensions and shapes of the primary inductive coupling component 116 are possible and contemplated. The active area material may be made of plastic and the housing material may be chrome-plated and made of metal, such as copper-zinc alloy (brass CuZn). In other embodiments, the housing material may be made of stainless steel.

In one embodiment, the primary inductive coupling component 116 is connected to a power supply, such as at least one battery 104 of the vehicle 102 with a connector, such as a direct flexible wire 122. In some embodiments, the power supply may be any DC power source in the vehicle 102. The battery 104 may provide electrical current to the primary inductive coupling component 116. The primary inductive coupling component 116 may have a coil of wire, such as a copper wire inside of the primary inductive coupling component 116 for generation of a magnetic field. As the electrical current moves through the primary inductive coupling component 116, a magnetic field is generated due to the conductivity of the primary inductive coupling component 116.

A second segment 114 of the inductive coupling lift gate platform 110 may include a receiver inductive coupling component 118. The receiver inductive coupling component 118 may be configured for receiving a contactless bidirectional transmission of power, given as voltage times current, from the primary inductive coupling component 116 across the air gap 120. The receiver inductive coupling component 118 may be embedded in a second cavity 130 of the second segment 114. In one embodiment, the receiver inductive coupling component 118 is made of chrome-plated brass. The receiver inductive coupling component 118 may have a coil of wire, such as a copper wire inside of the receiver inductive coupling component 118 for the generation of a magnetic field. In one embodiment, the receiver inductive coupling component 118 may have the same dimensions, shape, and/or materials as the primary inductive coupling component 116.

The mutual inductance between the receiver inductive coupling component 118 and the primary inductive coupling component 116 provides that the current flowing through the primary inductive coupling component 116 induces a voltage in the adjacent receiver inductive coupling component 118. The air gap 120 between the primary inductive coupling component 116 and the adjacent receiver inductive coupling component 118 provides that nearly all of the electromagnetic flux generated by the primary inductive coupling component 116 may be received by the receiver inductive coupling component 118. Configured as such, the primary inductive coupling component 116 and the receiver inductive coupling component 118 are magnetically linked together by a common magnetic flux.

In one embodiment, the air gap 120 may be approximately 7 mm in separation between the primary inductive coupling component 116 and the receiver inductive coupling component 118 when the first segment 112 and the second segment 114 of the two or more segments of the inductive coupling lift gate platform 110 are substantially parallel and in-line with one another in an unfolded position of the inductive coupling lift gate platform 110. In one embodiment, there may be an approximately 15 degree maximum angular misalignment between the primary inductive coupling component 116 and the receiver inductive coupling component 118 while still transferring power and/or data. In one embodiment, the primary inductive coupling component 116 and the receiver inductive coupling component 118 are cylindrical in shape and of equal or approximately equal length.

Figure 4:
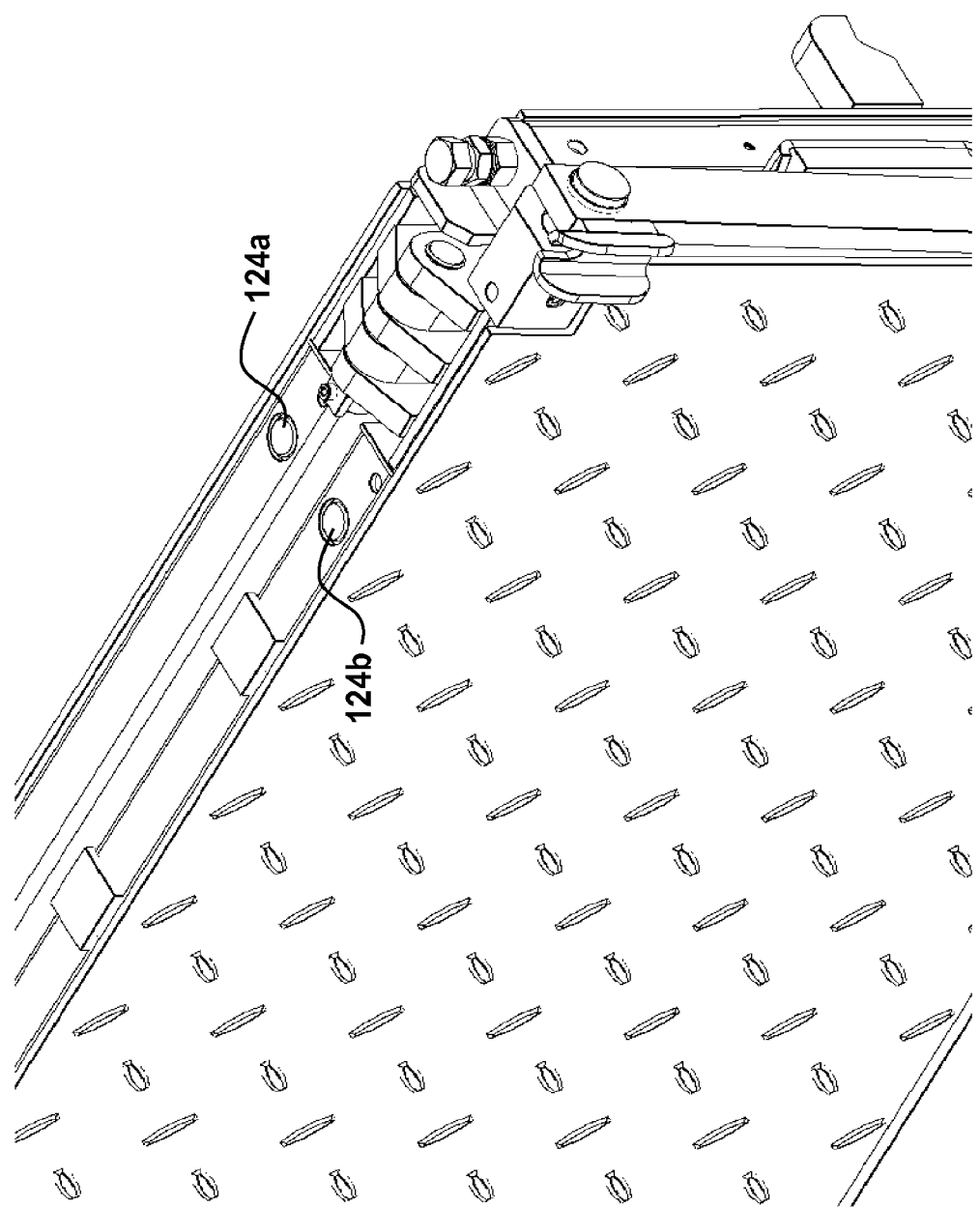
FIG. 4 depicts a close-up perspective view of the inductive coupling lift gate platform of FIG. 1 in a folded position.
Figure 6A:
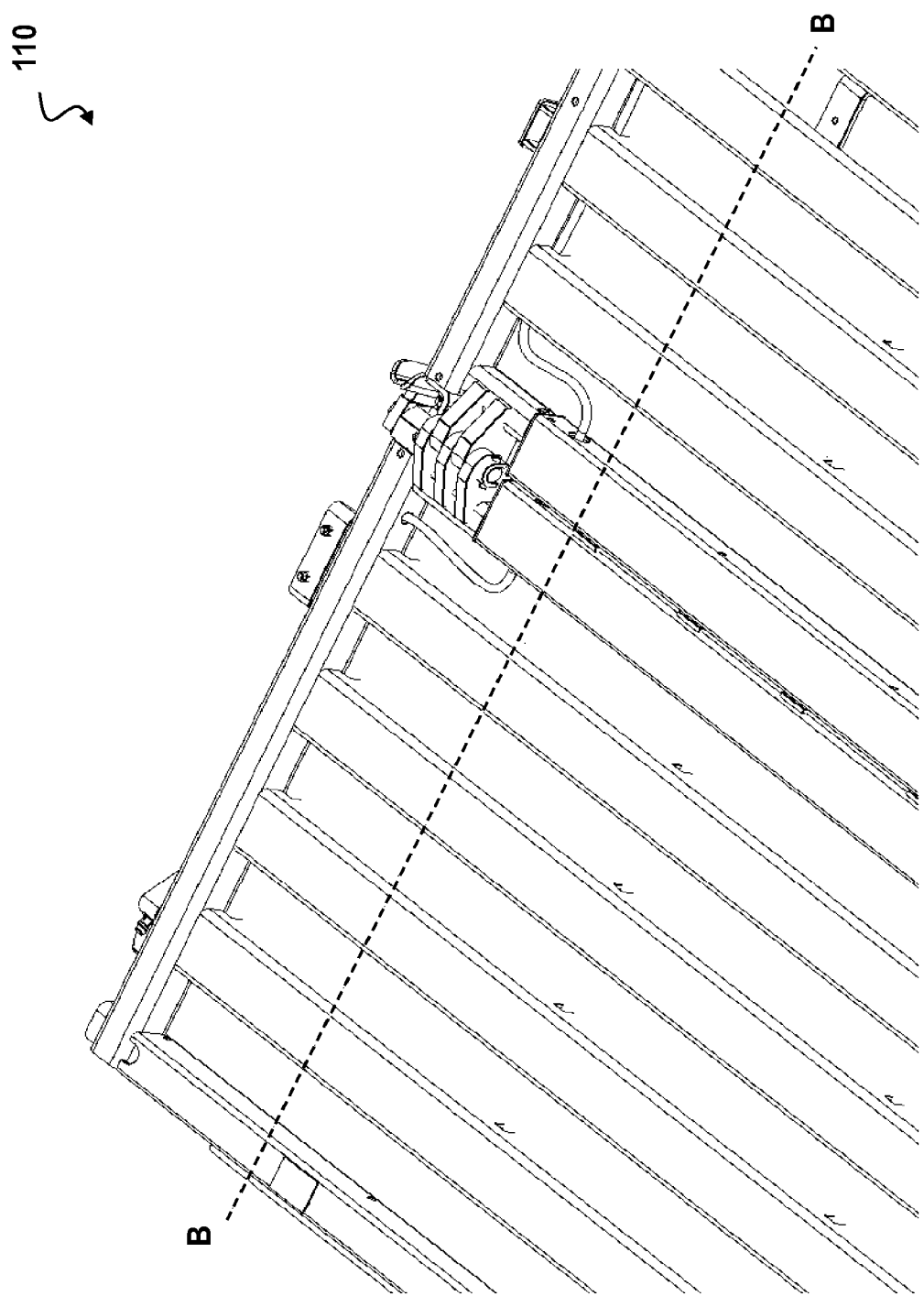
FIG. 6A depicts a perspective bottom view of the inductive coupling lift gate platform of FIG. 1 in an unfolded position.
Figure 6B:
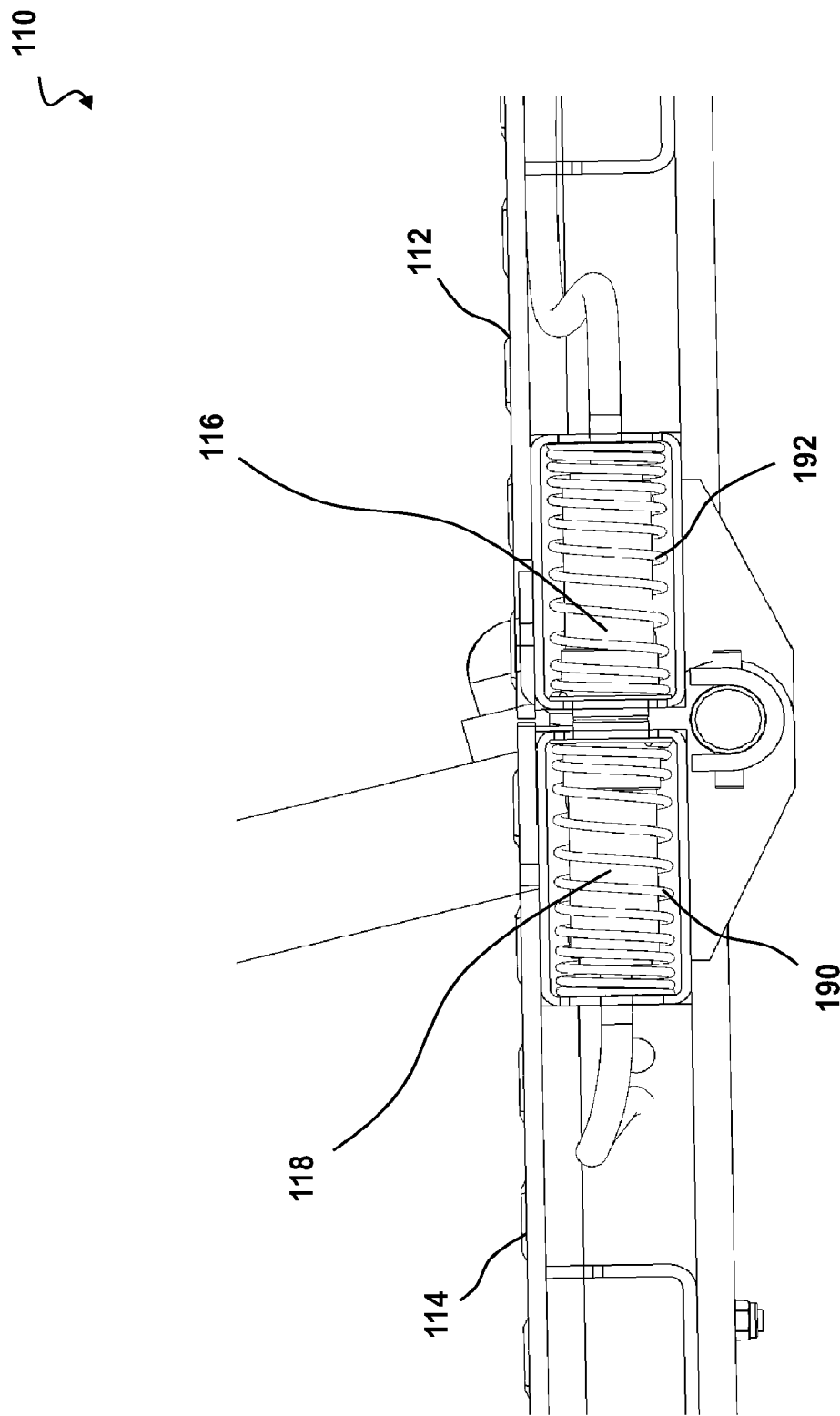
FIG. 6B depicts a cross-sectional side view of the inductive coupling lift gate platform of FIG. 6A about line B-B in the unfolded position.

As shown in FIG. 4, interfaces 124a,b of the primary inductive coupling component 116 and the receiver inductive coupling component 118, respectively, may have a circular cross-section that may face each other for bidirectional transmission of power and/or data across the air gap 120 when the inductive coupling lift gate platform 110 is in an unfolded configuration (see FIGS. 6A-6B). A first interface 124a of the primary inductive coupling component 116 interacts with the second interface 124b of the receiver inductive coupling component 118. The mutual inductance is at least a function of the area of the cross-sections of the interfaces 124a,b as well as the length of the coiled wire within each component 116,118.

In one embodiment, the placement of the primary inductive coupling component 116 and the receiver inductive coupling component 118 inside of the inductive coupling lift gate platform 110 may need to be adjusted if an undesired increase or decrease of the gap size of the air gap 120 between the primary inductive coupling component 116 and the receiver inductive coupling component 118 occurs.

Figure 5:
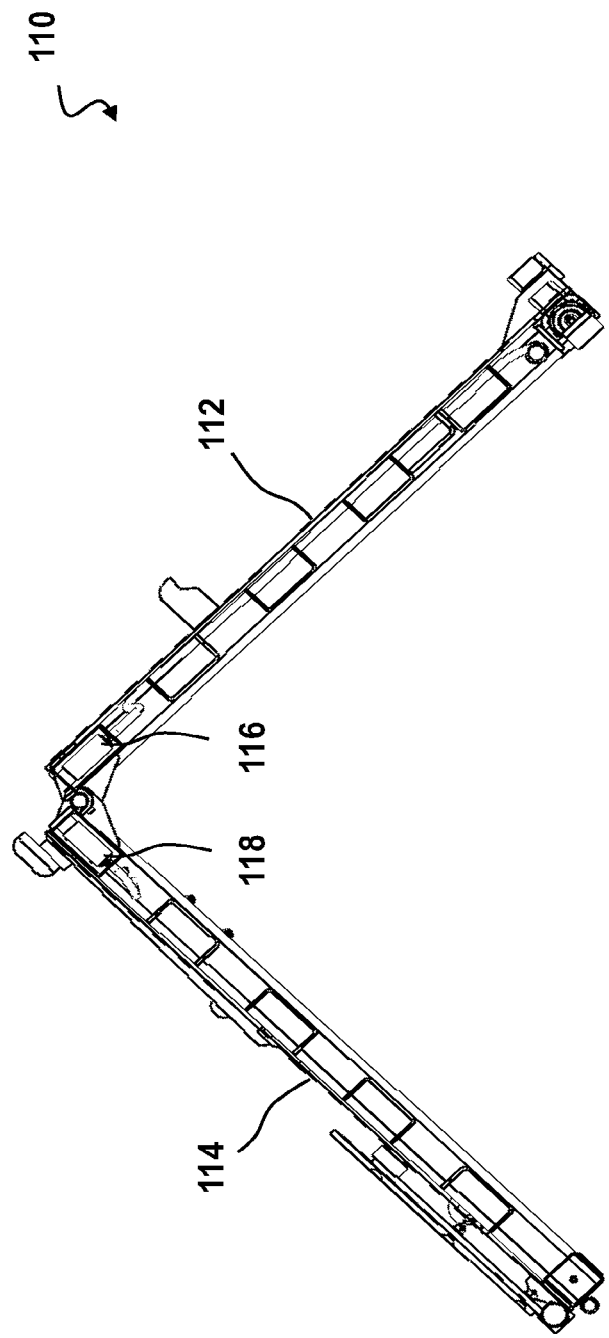
FIG. 5 depicts a cross-sectional side view of the inductive coupling lift gate platform of FIG. 1 about line A-A in a partially folded position.

With respect to FIG. 5, the first segment 112 of the inductive coupling lift gate platform 110 and the second segment 114 of the inductive coupling lift gate platform 110 are shown in a partially unfolded position. At this point, no inductive coupling is taking place, and hence, no power is being transferred from the primary inductive coupling component 116 to the receiver inductive coupling component 118.

As the first segment 112 and the second segment 114 are in an unfolded position, as shown in FIGS. 6A-6B, there may be inductive contact between the primary inductive coupling component 116 and the receiver inductive coupling component 118, allowing direct power transmission from the vehicle's battery 104, or any other power source on the vehicle, all the way through the inductive coupling lift gate platform 110.

FIG. 6B depicts a cross-sectional side view of the inductive coupling lift gate platform 110 of FIG. 6A about line B-B in the unfolded position. In some embodiments, one or more spring-loaded mechanisms 190, 192 ensure that the primary inductive coupling component 116 and the receiver inductive coupling component 118 seat flush against each other. In one embodiment, the inductive coupling lift gate platform 110 may include a spring-loaded mechanism 190, 192 in each segment 112,114, to spring load the primary inductive coupling component 116 and the receiver inductive coupling component 118. More specifically, when the inductive coupling lift gate platform 110 is in the folded position, the spring-loaded mechanisms may cause the primary inductive coupling component 116 and the receiver inductive coupling component 118 to extend past the boundary of their respective segments 112,114, to compensate for a potential increase in any air gap at a future time. In another embodiment, such as when the inductive coupling lift gate platform 110 is in an unfolded position, the spring-loaded mechanisms may ensure that the primary inductive coupling component 116 and the receiver inductive coupling component 118 seat flush against each other, but do not apply a force against each other, thus avoiding damage to the primary inductive coupling component 116 and the receiver inductive coupling component 118. Therefore, the spring-loaded mechanisms would allow for the primary inductive coupling component 116 and the receiver inductive coupling component 118 to find a new equilibrium position without induced pressure on internal/external components of the primary inductive coupling component 116 and the receiver inductive coupling component 118. In one embodiment, the spring-loaded mechanism 190, 192 may be a coiled spring that surrounds each respective inductive coupling component 116, 118.

In one embodiment, the power transferred to the receiver inductive coupling component 118 may be used to power a lighting device 106, as shown in FIG. 7. The lighting device 106 may be on one or both sides of the second segment 114 of the inductive coupling lift gate platform 110. In one embodiment, the power transferred to the receiver inductive coupling component may be used to power a lighting device, such as lighting device 106 as shown in FIG. 7. The lighting device 106 may be a light-emitting diode (LED) in some embodiments. In other embodiments, the lighting device 106 may be any light, including, but not limited to lasers, LEDs, incandescent lights, and the like. The lighting device 106 may provide a constant source of light in some embodiments. In other embodiments, the lighting device 106 may flash or follow some other pattern. In some embodiments, the lighting device 106 intensity and/or flashing may be based on one or more external conditions, such as an ambient light level.

Figure 8:
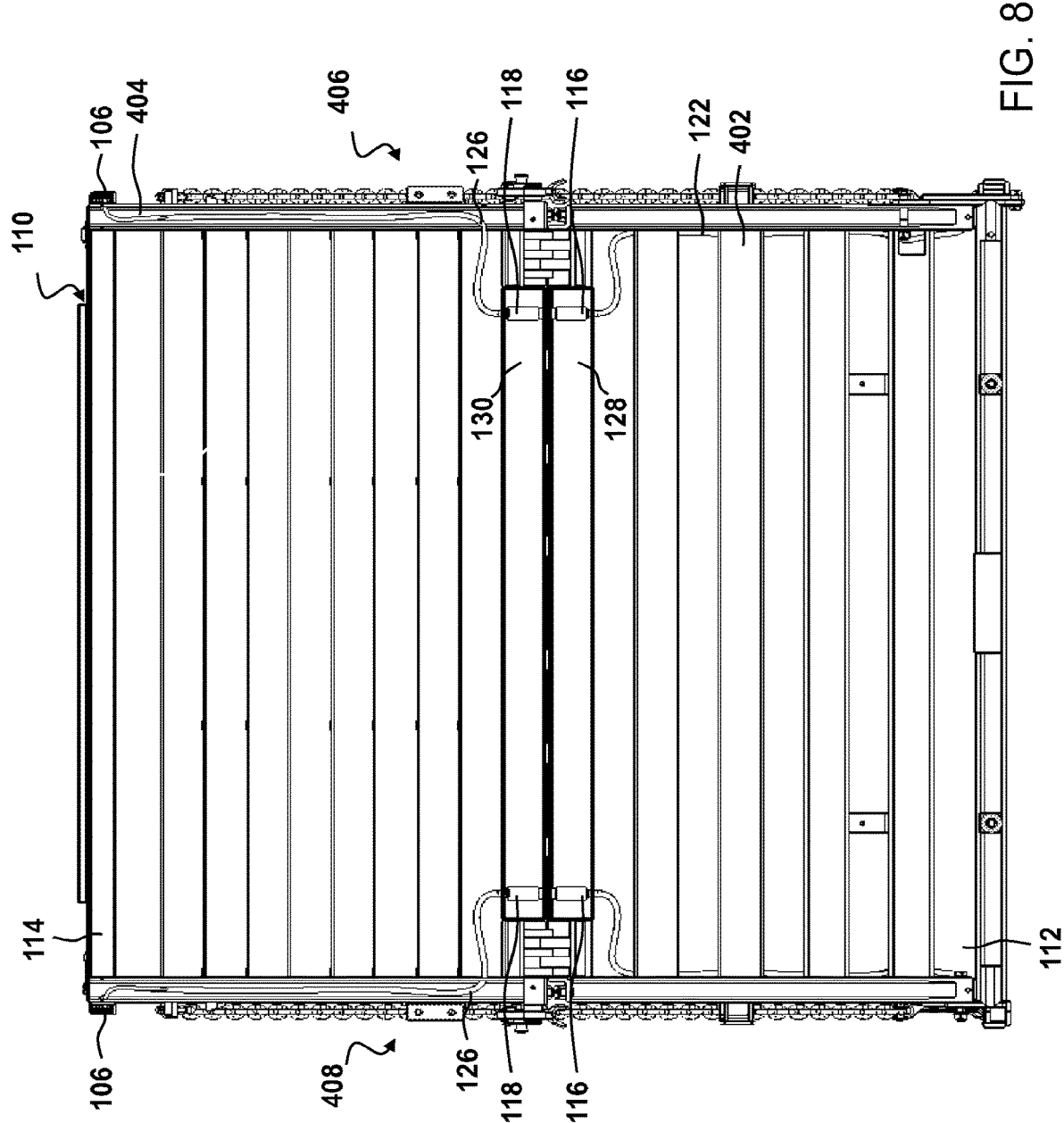
FIG. 8 depicts a bottom view of the inductive coupling lift gate platform of FIG. 1 in an unfolded position with the lighting device of FIG. 7 connected with a wire to a component of the embedded inductive coupler of FIG. 3.

With respect to FIG. 8, a partial cutaway bottom view shows the receiver inductive coupling component 118 of the second segment 114 transmits the electrical current through a wire 126 that may be fully- or partially-embedded in the second segment 114 to the lighting device 106 to provide power to the lighting device 106.

The direct power transmission provided by the inductive couplers 116, 118 may eliminate the need for sensors and batteries to be housed inside the lighting device 106. The direct power transmission provided by the inductive couplers 116, 118 may further provide for more consistent output of the lighting device 106. In another embodiment, the inductive couplers 116, 118 may power other devices, such as sensors and foot controls located on the inductive coupling lift gate platform 110. For example, the inductive couplers 116, 118 may power an angle sensor, a gyroscope, a pressure sensor, a transducer, and the like. The inductive couplers 116, 118 may further power lasers for determining operating parameters.

A first wire 122 may be connected to at least one battery, such as battery 104 in FIG. 3. In some embodiments, at least a portion of the first wire 122 may be disposed in one or more support members 402 of the first segment 112 of the inductive coupling lift gate platform 110. For example, one or more apertures may be located in the one or more support members 402 to route the first wire 122 between the battery and the primary inductive coupling component 116. Locating at least a portion of the first wire 122 in the one or more support members 402 may protect the first wire 122 during use and/or avoid snagging of the first wire 122.

Power and/or data may be transmitted from the primary inductive coupling component 116 to the receiver inductive coupling component 118 over an air gap, such as air gap 120 in FIG. 3. In some embodiments, the primary inductive coupling component 116 and the receiver inductive coupling component 118 may be in direct contact when the inductive coupling lift gate platform 110 is in the unfolded position. In some embodiments, one or more spring-loaded mechanisms ensure that the primary inductive coupling component 116 and the receiver inductive coupling component 118 seat flush against each other.

Figure 10:
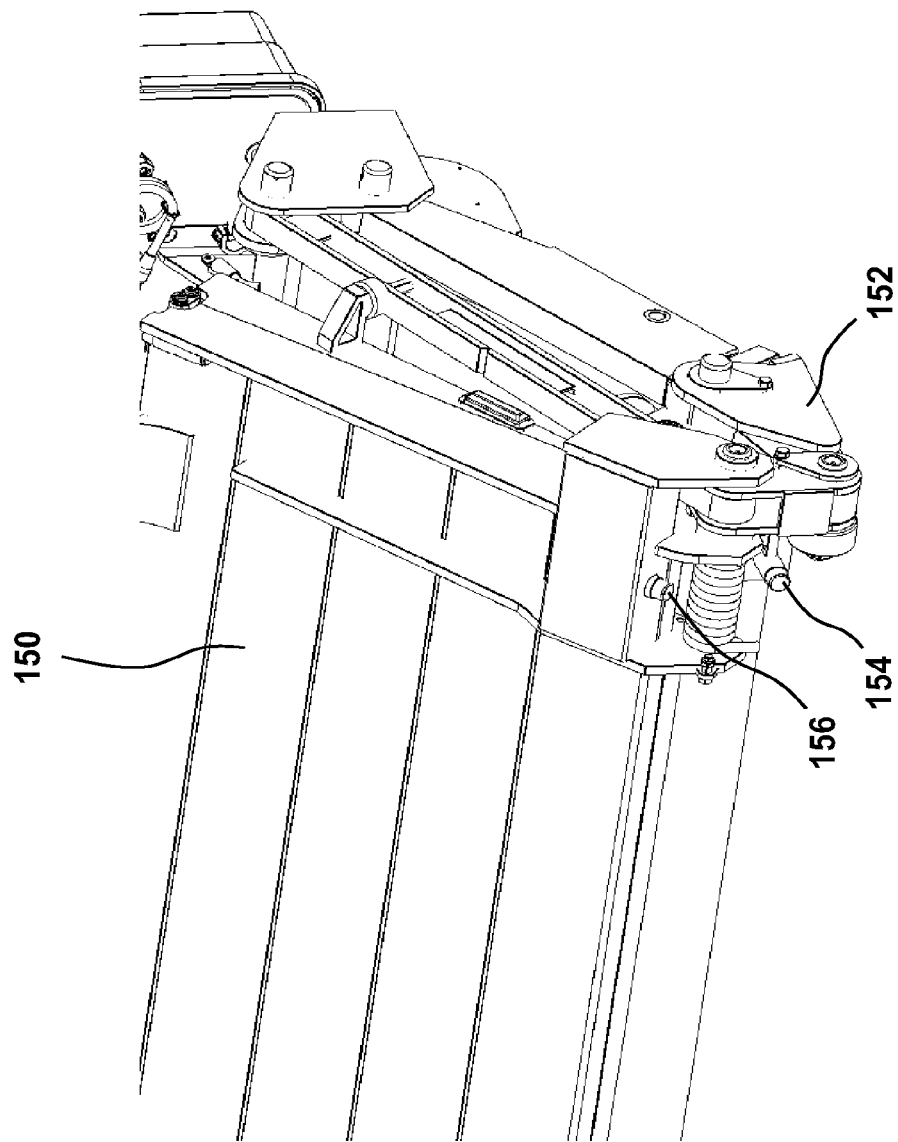
FIG. 10 depicts a perspective view of the inductive coupling lift gate platform of FIG. 9 in a folded position.

A second wire 126 may connect the receiver inductive coupling component 118 to the lighting device 106. In some embodiments, at least a portion of the second wire 126 may be disposed in one or more support members 404 of the second segment 114 of the inductive coupling lift gate platform 110. For example, one or more apertures may be located in the one or more support members 404 to route the second wire 126 between the receiver inductive coupling component 118 and the lighting device 106. Locating at least a portion of the second wire 122 in the one or more support members 404 may protect the second wire 404 during use and/or avoid snagging of the second wire 404. In some embodiments, a greater portion of the second wire 126 may be disposed in a respective one or more support members 404 than a portion of the first wire 122 disposed in a respective one or more frame member 402. The second segment 114 may experience a greater range of movement as compared to the first segment 112 of the inductive coupling lift gate platform 110. For example, the second segment 114 may move from a folded position folded over the first segment 112 to an unfolded position where the second segment is substantially in-line with the first segment 112. While inductive couplers 116, 118 are shown on both sides 406, 408 of the inductive coupling lift gate platform 110, inductive couplers 116, 118 may only be present on one side of the inductive coupling lift gate platform 110 in some embodiments. For example, one set of inductive couplers 128, 130 may be proximate a first side 406 of the lift gate platform 110 and a second set of inductive couplers may be proximate a second side 408 of the lift gate platform. Where the first side 406 is distal from the second side 408 of the lift gate platform 110. In other embodiments, more than two sets of inductive couplers 116, 118 may be used in the coupling lift gate platform 110, such as for transmitting data and/or power to one or more lighting devices 106 and/or sensors. For example, the coupling lift gate platform 110 may have a first set of inductive couplers connecting the coupling lift gate platform 110 and a lifting mechanism, such as shown in FIG. 10 and a second set of inductive couplers connecting the first segment 112 to the second segment 114 of the inductive coupling lift gate platform 110. In some embodiments, the two or more inductive couplers 116, 118 may be used to provide redundant power and/or data to one or more lighting devices 106 and/or sensors.

With respect to FIG. 9, an alternative lift gate 148 has an accompanying inductive coupling lift gate platform 150. The lift gate platform 150 may include two or more segments, such as a lift gate platform 150 having two segments that may be folded against one another for storage and unfolded for operation. A lifting mechanism 152 may move the lift gate platform between a stowed position under a vehicle and an unstowed position for use.

With respect to FIG. 10, an inductive coupling lift gate platform 150 may be in a stowed position relative to a lifting mechanism 152. The lifting mechanism may include a primary inductive coupling component, such as primary inductive coupling component 154. The inductive coupling lift gate platform 150 may include a receiver inductive coupling component, such as receiver inductive coupling component 156, with the receiver inductive coupling component 156 configured for receiving contactless bidirectional transmission of power, given as voltage times current, from the primary inductive coupling component 154 across an air gap over via direct contact. When the folded platform assembly is deployed from the unstowed position, the two couplers 154, 156 make contact. In some embodiments, the assembly also has couplers between a main section and a flip over section of the inductive coupling lift gate platform 150 as shown and described herein, such as in FIG. 8.

With respect to FIG. 11, an alternative lift gate 158 may include a runner 159 and an accompanying inductive coupling lift gate platform 160. The lift gate platform 160 may include one or more segments, such as a lift gate platform 160 having one segment. The lift gate platform 160 may be folded against the runner 159 for storage and unfolded for operation. The lift gate 158 may include the primary inductive coupling component and the receiver inductive coupling component described above. In one embodiment, the primary inductive coupling component may be integrated into the runner 159, and the receiver inductive coupling component may be integrated into the platform 160. The receiver inductive coupling component is again configured for receiving contactless bidirectional transmission of power, given as voltage times current, from the primary inductive coupling component across an air gap. In one embodiment, the power transferred to the receiver inductive coupling component may be used to power a lighting device.

With respect to FIGS. 12 and 13, yet another alternative lift gate 168 has an accompanying inductive coupling lift gate platform 170 and a rail 176. The lift gate platform 170 may include two or more segments, such as a lift gate platform 170 having two segments that may be folded against one another for storage and unfolded for operation. The first segment may be a main platform section 172 and the second segment may be a flip over section 174. Additional inductive coupling components may be included in the two or more segments of the lift gate platform 170 such as described above. The lift gate 168 may include the primary inductive coupling component and the receiver inductive coupling component described above. In one embodiment, the primary inductive coupling components 116 may be connected to the rail 176 and the receiver inductive coupling component may be connected to a trunnion tube 180. The receiver inductive coupling component 118 is again configured for receiving contactless bidirectional transmission of power, given as voltage times current, from the primary inductive coupling component 116 across an air gap. In one embodiment, the power transferred to the receiver inductive coupling component 118 may be used to power a foot control device.

In operation, as a user deploys the inductive lift gate platform 170 from a stowed position (e.g., below the vehicle) to an active position (e.g., extended from the vehicle), the trunnion tube 180 rolls, slides, and/or moves, along the rail 176 allowing for continuous inductive coupling to the lift gate platform 170 at the extended position.

The coupling effect occurs between the primary coupler on the rail 176 and the receiver coupler on the trunnion tube 180. The receiver coupler on the trunnion tube 180 may be connected to an accessory on the platform, such as a foot control. The trunnion tube 180 may slide along the rail 176. Coupling component 116 may stay stationary on the rail 176, while coupling component 118 may slide back and forth with the trunnion tube 180.

In FIG. 13, the coupling effect will occur only at the extended position, when coupling component 118 reaches the location right below coupling component 116. However, the respective placement of coupling components 116, 118 may be varied based on a desired coupling location. In FIG. 12, coupling components 116 and 118 are not coupled, because the trunnion tube 180 is not in the extended position as shown in FIG. 13.

As described in previous embodiments, the direct power transmission provided by the inductive coupler may eliminate the need for sensors and batteries to be housed inside a lighting device. The direct power transmission provided by the inductive coupler may further provide for more consistent output of a lighting device. In another embodiment, the inductive coupler may power other devices, such as sensors and foot controls located on the inductive coupling lift gate platform 170. For example, the inductive coupler may power an angle sensor, a gyroscope, a pressure sensor, a transducer, and the like. The configuration of the inductive coupling components provide for continuous inductive coupling, and, therefore, the ability to transfer power and signal wirelessly, allowing for the sensors to be placed anywhere on the lift gate platform 170.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. An inductive coupling platform system comprising:
   an inductive coupling lift gate platform comprising:
   a first segment;
   a second segment, wherein the second segment is configured to rotate relative to the first segment between a folded position and an unfolded position, wherein the first segment is in-line with the second segment in the unfolded position;
   at least one primary inductive coupling component disposed in at least a portion of the first segment;
   at least one receiver inductive coupling component disposed in at least a portion of the second segment; and
   at least one spring-loaded mechanism surrounding at least one of the at least one primary inductive coupling component and the at least one receiver inductive coupling component;
   wherein the at least one primary inductive coupling component and the at least one receiver inductive coupling component are configured to provide inductive coupling therebetween; and
   wherein data is transmitted via the inductive coupling between the at least one primary inductive coupling component and the at least one receiver inductive coupling component.

2. The system of claim 1, wherein the at least one primary inductive coupling component and the at least one receiver inductive coupling component are configured to provide the inductive coupling therebetween in the unfolded position.

3. The system of claim 1, wherein the at least one primary inductive coupling component and the at least one receiver inductive coupling component are configured to selectively transmit at least one of electrical power and data, when inductive coupling is established therebetween in the unfolded position.

4. The system of claim 1, wherein the at least one primary inductive coupling component and the at least one receiver inductive coupling component are configured to provide inductive coupling by contact therebetween.

5. The system of claim 1, wherein the at least one primary inductive coupling component and the at least one receiver inductive coupling component are configured to provide inductive coupling through an air gap therebetween when the at least one primary inductive coupling component and the at least one receiver inductive coupling component are disposed proximate one another.

6. The system of claim 1, further comprising:
   a lift gate, wherein the lift gate comprises the inductive coupling lift gate platform;
   a vehicle, wherein the lift gate is connected at a rear of the vehicle;
   at least one battery of the vehicle;
   a first wire, wherein the first wire is connected between the at least one battery and the at least one primary inductive coupling component, and wherein power is configured to be transmitted from the at least one battery to the at least one primary inductive coupling component via the first wire;
   at least one lighting device; and
   a second wire, wherein the second wire is connected between the at least one receiver inductive coupling component and the at least one lighting device, and wherein power is configured to be transmitted from the at least one receiver inductive coupling component to the at least one primary inductive coupling component via the second wire.

7. The system of claim 1, wherein the at least one primary inductive coupling component and the at least one receiver inductive coupling component are configured to selectively transmit at least one of electrical power and data, when inductive coupling is established therebetween.

8. An inductive coupling platform system comprising:
   an inductive coupling lift gate platform;
   a lifting mechanism configured to move the inductive coupling lift gate platform between a stowed position and an unstowed position;
   a primary inductive coupling component disposed on the lifting mechanism; and
   a receiver inductive coupling component disposed on the inductive coupling lift gate platform, wherein the primary inductive coupling component and the receiver inductive coupling component are configured to provide inductive coupling therebetween, and wherein data is transmitted via the inductive coupling between the primary inductive coupling component and the receiver inductive coupling component; and
   a spring-loaded mechanism surrounding at least one of the primary inductive coupling component and the receiver inductive coupling component.

9. The system of claim 8, wherein the primary inductive coupling component and the receiver inductive coupling component are configured to provide the inductive coupling therebetween in the unstowed position.

10. The system of claim 8, wherein the inductive coupling lift gate platform comprises:
   a first segment;
   a second segment, wherein the second segment is configured to rotate relative to the first segment between a folded position and an unfolded position, wherein the first segment is in-line with the second segment in the unfolded position;
   a first inductive coupler disposed proximate a first side of the inductive coupling lift gate platform;
   wherein the first inductive coupler is configured to provide inductive coupling in the unfolded position.

11. The system of claim 10, further comprising:
   a second inductive coupler disposed proximate a second side of the inductive coupling lift gate platform, wherein the first side is distal from the second side of the inductive coupling lift gate platform, wherein the second conductive coupler is configured to provide inductive coupling in the unfolded position, wherein the inductive coupling is broken for the first inductive coupler and the second conductive coupler in the folded position.

12. The system of claim 8, further comprising:
   a lift gate, wherein the lift gate comprises the inductive coupling lift gate platform and the lifting mechanism;
   at least one lighting device connected to the inductive coupling lift gate platform; and
   at least one power source, wherein power is configured to be transmitted from the at least one power source to the at least one lighting device through the primary inductive coupling component and the receiver inductive coupling component.

13. The system of claim 12, further comprising:
   a first wire, wherein power is configured to be transmitted from the primary inductive coupling component to the at least one lighting device via the first wire.

14. The system of claim 13, wherein at least a portion of the first wire is disposed in one or more support members of the first segment of the inductive coupling lift gate platform.

* * * * *